(12) United States Patent
Jung et al.

(10) Patent No.: US 8,367,922 B2
(45) Date of Patent: Feb. 5, 2013

(54) MUSIC COMPOSITION METHOD AND SYSTEM FOR PORTABLE DEVICE HAVING TOUCHSCREEN

(75) Inventors: Moon Sik Jung, Seoul (KR); Seung Woo Shin, Seoul (KR); Myoung Hwan Han, Seoul (KR); Joong Sam Yun, Incheon (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/372,640

(22) Filed: Feb. 14, 2012

(65) Prior Publication Data

US 2012/0139861 A1 Jun. 7, 2012

Related U.S. Application Data

(63) Continuation of application No. 12/767,880, filed on Apr. 27, 2010, now Pat. No. 8,138,408.

(30) Foreign Application Priority Data

May 12, 2009 (KR) .......................... 10-2009-0041112

(51) Int. Cl.
*G10H 1/36* (2006.01)
*G10H 7/00* (2006.01)

(52) U.S. Cl. ............................................ 84/610

(58) Field of Classification Search .............. 84/610, 84/613, 634, 637
See application file for complete search history.

(56) References Cited

U.S. PATENT DOCUMENTS

| | | | |
|---|---|---|---|
| 6,245,984 B1 | 6/2001 | Aoki et al. | |
| 7,157,638 B1 * | 1/2007 | Sitrick | 84/477 R |
| 7,612,278 B2 * | 11/2009 | Sitrick et al. | 84/609 |
| 2007/0044639 A1 | 3/2007 | Farbood et al. | |
| 2008/0110323 A1 | 5/2008 | Bergfeld et al. | |
| 2009/0174677 A1 * | 7/2009 | Gehani et al. | 345/173 |
| 2010/0300269 A1 * | 12/2010 | Applewhite | 84/610 |

FOREIGN PATENT DOCUMENTS

| | | |
|---|---|---|
| FR | 2866726 A1 | 8/2005 |
| WO | 01/08133 A1 | 2/2001 |
| WO | 2007/053917 A1 | 5/2007 |

* cited by examiner

*Primary Examiner* — Jeffrey Donels
(74) *Attorney, Agent, or Firm* — Cha & Reiter, LLC

(57) ABSTRACT

A music composition method and system is provided for composing a music piece using a touch interaction with a touchscreen-enabled portable device. A music composition method includes setting an accompaniment with chords varying according to the progress of a unit play time; playing the accompaniment; displaying, when a series of touches are detected, a trace of the touches; playing a melody of tones mapped to positions of the touches and matching notes of a note scale defined by chords of the accompaniment playing at the times when the touches are detected; and saving the trace, melody, and accompaniment as a music piece as an ensemble.

19 Claims, 13 Drawing Sheets

MUSIC COMPOSITION METHOD AND SYSTEM FOR PORTABLE DEVICE HAVING TOUCHSCREEN

CLAIM OF PRIORITY

This application is a Continuation of U.S. patent application Ser. No. 12/767,880 filed on Apr. 27, 2010 which claims priority under 35 U.S.C. §119(a), of that Korean patent application filed in the Korean Intellectual Property Office on May 12, 2009 and assigned Serial No. 10-2009-0041112, the entire disclosure of which is hereby incorporated by reference in its entirety.

BACKGROUND OF THE INVENTION

1. Field of the Invention

The present invention relates to electronic music composition and, in particular to, a music composition method and system for composing music piece using a touch interaction with a touchscreen-enabled portable device.

2. Description of the Related Art

As the communication technology has been rapidly developed to provide better performance and various new functions have been integrated into a mobile phone, the user interface has been expanded to accommodate control the many functions that are operable in the mobile phone.

Recently, the mobile phones have advanced in entertainment functions and even some enable the user to create entertainment contents. With the widespread of touchscreen-enabled devices, the entertainment functions are implemented in association with the gestural interaction through the touchscreen.

A music creation application is one good example of an entertainment application and typically uses a software sequencer. A sequencer-based application is implemented for the user to place each note (tone, sound, and melody) on a Note Scale or arrange patterns, i.e. pieces each containing Musical Instrument Digital Interface (MIDI) note information in units of measure. As known, the MIDI is an industry standard protocol that enables electronic musical instruments, such as keyboard controllers and computers, to communicate with each other.

However, it is not easy to implement the music applications in a portable device, e.g. mobile phone. In the case of the melody creation method which receives the melody consisting of notes, the limited size of the display screen of portable device makes creating a melody difficult. In the case of the pattern arrangement method, even known as a typical music composition method, it cannot achieve its merits for diverse and intuitive composition in the size-limited portable device. Particularly, the conventional music composition methods are complicated for the user, especially beginner, to compose a multi-instrument sound music like a concert requiring technical knowledge for mixing the instruments.

SUMMARY OF THE INVENTION

The present invention provides a music composition method and system for a touchscreen-enabled portable device that is capable of composing music intuitively with gestural finger interaction.

In accordance with an exemplary embodiment of the present invention, a music composition method operable in a portable device having a touchscreen includes setting an accompaniment with chords varying according to the progress of a unit play time; playing the accompaniment; displaying, when a series of touches are detected, a trace of the touches; playing a melody of tones mapped to positions of the touches and matching notes of a note scale defined by chords of the accompaniment playing at the times when the touches are detected; and saving the trace, melody, and accompaniment as a music piece as an ensemble.

In accordance with another exemplary embodiment of the present invention, a music composition method for a portable device having a touchscreen includes displaying a handle moving along a vertical axis on the touchscreen in response to a input on the touchscreen; selecting an accompaniment having at least one chord per unit play time; playing, when the handle moves by a touch event, a tone mapped to a moved position and matching a note of a note scale corresponding to the chord at the time when the touch is detected and the selected accompaniment; and saving the tone and accompaniment along with a trace of the touch.

In accordance with still another exemplary embodiment of the present invention, a music composition system for a portable device having a touch screen a drawing region having a play bar which indicates a current tone of a melody and a current play time of an accompaniment on the touch screen; an accompaniment region which displays unit play times matching the accompaniment; and a control region which provides menu options for controlling the melody.

In accordance with still another exemplary embodiment of the present invention, a portable terminal for composing a musical composition includes a touch screen; a display unit; and a processor in communication with a memory, the memory including code, which accessed by the processor causes the processor to: receive an input from the touch screen; set an accompaniment with chords varying according to progress of a unit play time in response to the input; play the accompaniment; display on the display unit a trace of a plurality of touches as the plurality of touches is detected on the touch screen; play a melody of tones mapped to positions of the plurality of touches and matching notes of a note scale defined by chords of the accompaniment playing at the times when the touches are detected; and save the trace, melody, and accompaniment as a music piece in an ensemble.

BRIEF DESCRIPTION OF THE DRAWINGS

The above features and advantages of the present invention will be more apparent from the following detailed description in conjunction with the accompanying drawings, in which:

FIG. 1b is a diagram illustrating a principle of composing a music piece on the composition mode screen of FIG. 1a;

FIG. 2b is a diagram illustrating operations of a composition mode screen of the portable device is association with the procedure of FIG. 2a;

DETAILED DESCRIPTION OF THE INVENTION

Figure 1A:
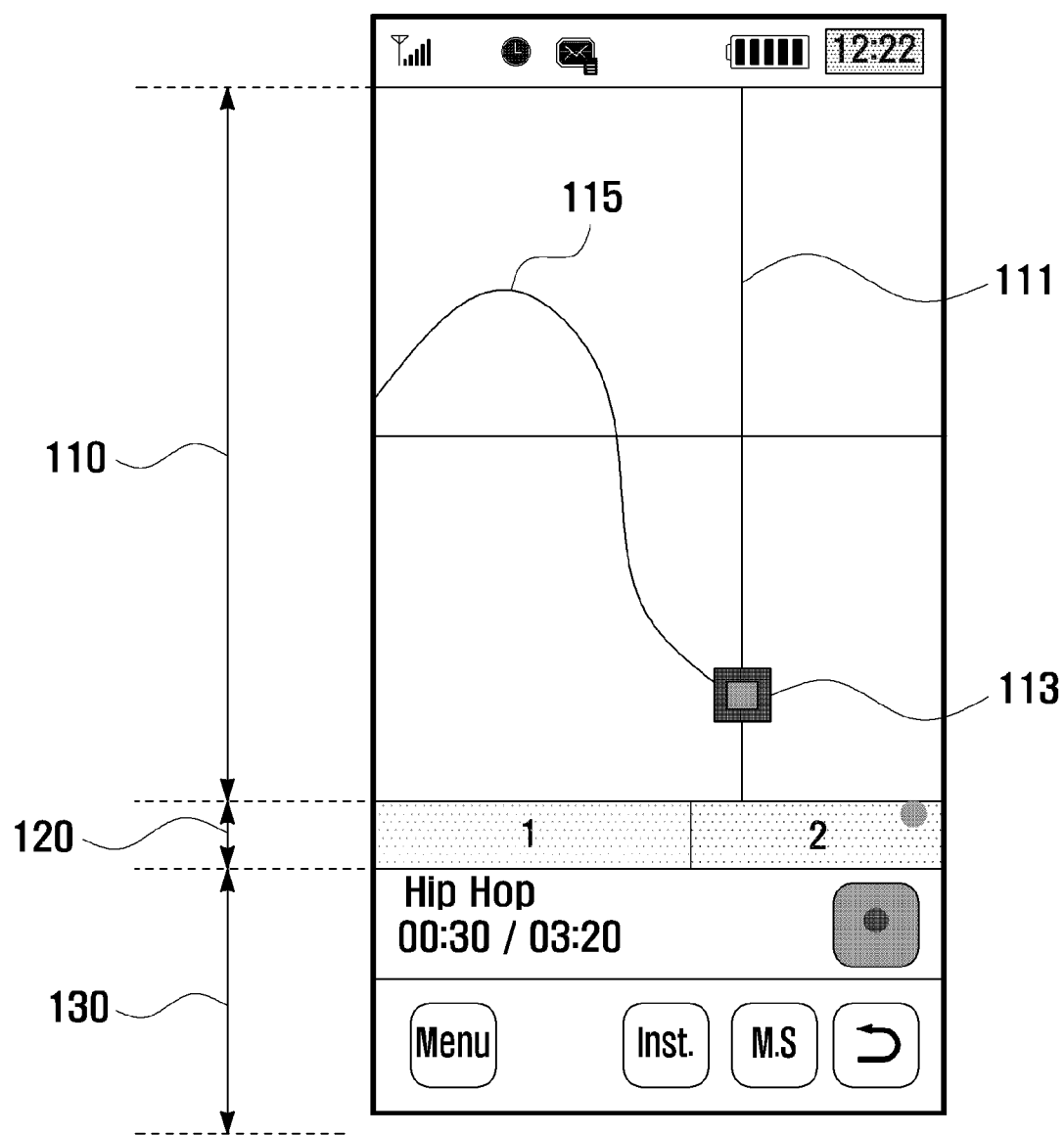
FIG. 1a is a diagram illustrating a composition mode screen of a music composition system according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the following, a description is made of the portable device having a touchscreen that provides a user interface enabling the user to compose music intuitively. The touchscreen provides the user with an empty virtual music sheet such that the user composes a music piece intuitively by filling the virtual music sheet with finger touch inputs. This enables the user having no expert knowledge to compose a music piece and provides even the expert composer with an intuitive composition interface, resulting in the promotion of music composition.

In an exemplary embodiment of the present invention, the music composition system is configured for the user to input a melody in harmony with an accompaniment such that the beginners can create a music piece with appropriate chords. Typically in the case of a piano music, the right hand plays a melody while the left hand plays the chords. At this time, the left hand part is regarded as the accompaniment. In a vocal song or a violin sonata, the entire part of the piano becomes the accompaniment of the soloist part and also the playing of the piano or the entire ensemble, such as orchestra, is called accompaniment. In exemplary embodiments of the present invention, a music piece including the "melody" and "accompaniment" can be composed by the touch inputs of the user on the touchscreen presenting a virtual music sheet.

Preferably, the music composition system according to an exemplary embodiment of the present invention is configured such that the melody and accompaniment are written in harmonic chord progression. In case that the user inputs a melody through the touchscreen, the portable device generates a chord progression in harmony with a specific accompaniment. In the exemplary embodiments of the present invention, the music composition system provides an interface for a user to input, edit, and play a melody and accompaniment.

Although the description is made of the music composition system implemented with a touchscreen as the user input interface, the present invention is not limited thereto. For example, the music composition system of the present invention can be implemented with a touchpad or other input devices.

In the exemplary embodiments of the present invention, the touch inputs include various touch gestures such as 'tap', 'double tap', 'hold', 'touch and move', 'drag and drop', and 'flick'.

Here, the term "touch" means an action in which the user makes a contact on the touchscreen with a part of his/her body (e.g. finger) or an object (e.g. stylus). The term "tap" means an action in which the user puts a finger/stylus on the touchscreen and then lift it up without losing a moment. The term "double tap" means an action in which the user makes the "tap" gesture twice quickly on the touchscreen. The term "hold" means an action in which the user maintains the contact of a finger/stylus on the touchscreen over a predetermined time duration. The term "touch and move" means an action in which the user makes a contact at a position on the touch screen with a finger/stylus, moves the finger/stylus in a direction, and releases the contact at another position on the touchscreen. The term "drag and drop" means an action in which the user puts a finger/stylus at a position to hold a movable item on the touchscreen, moves the finger/stylus to drag the item in a direction, and releases the contact to place the item at an intended position.

In an exemplary embodiment of the present invention, a music piece can be created in "composition mode", arranged in "arrangement mode", and played in "playback mode". Also, a music piece can be created, arranged, and played in "ensemble mode" for various instruments and adjusted in "mixing mode" for setting the parameters such as volumes and pans of the accompaniment instruments.

The portable device can operate in one of the composition mode, arrangement mode, playback mode, ensemble mode, and mixing mode depending on the input device and user interface environment of the portable device.

Figure 1B:
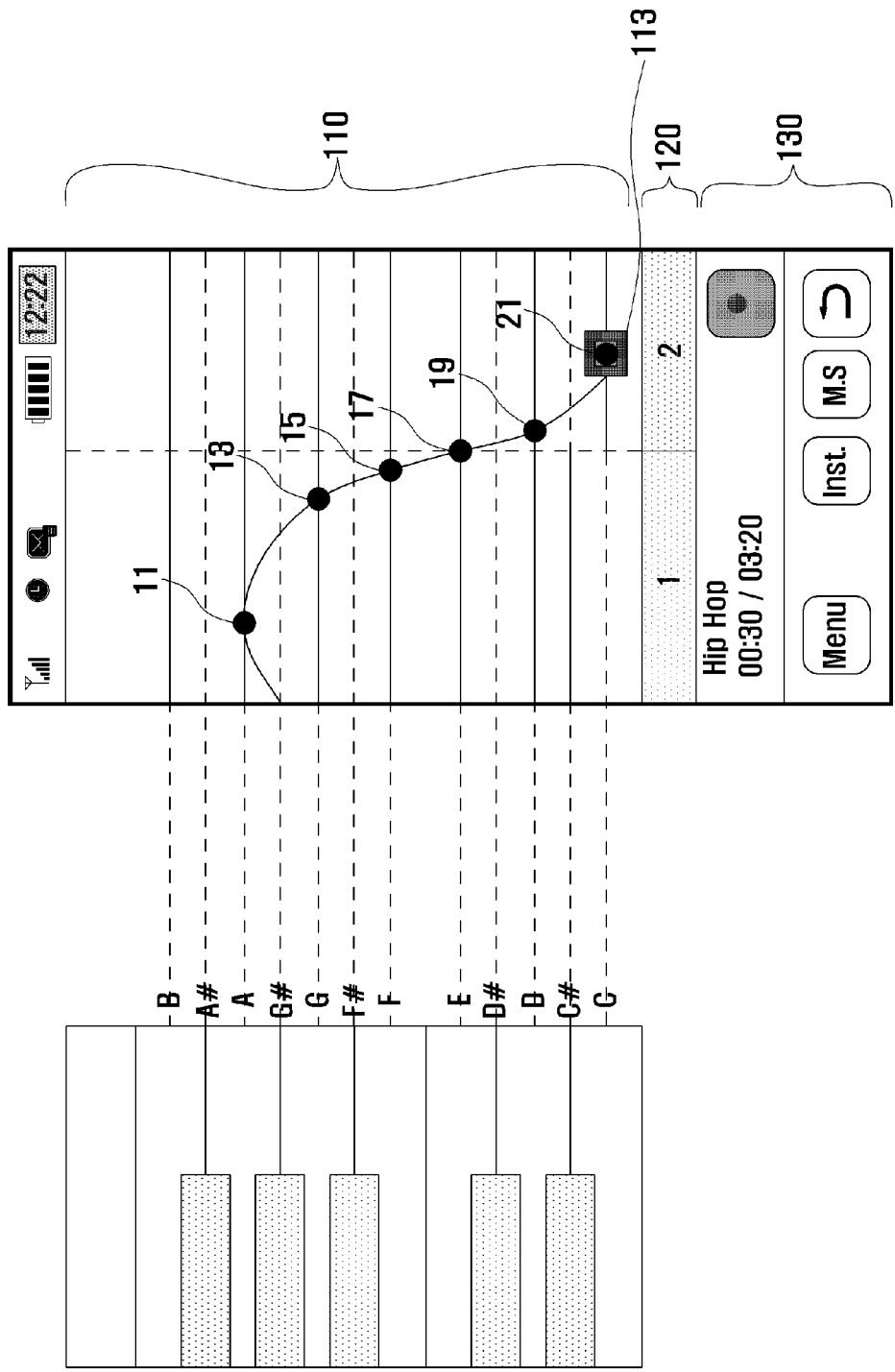

First, a description is made of the composition mode. FIG. 1a is a diagram illustrating a composition mode screen of a music composition system according to an exemplary embodiment of the present invention, and FIG. 1b is a diagram illustrating a principle of composing a music piece on the composition mode screen of FIG. 1a.

As shown in FIG. 1a, the composition mode screen includes a drawing region 110, an accompaniment playback region 120, and a control region 130.

The drawing region 110 and the accompaniment playback region 120 function as a music sheet and shows the progress of the melody and accompaniment with the movement of a bar from left to right.

The drawing region 110 is used as a music sheet such that the user can build a melody by arranging notes thereon. That is, the drawing region 110 provides the note scales. In FIG. 1a, the vertical axis of the drawing region 110 is mapped to the note scales.

The portable device plays the music represented by the sheet drawn in the drawing region 110. Reference numeral 111 denotes a play bar indicating the current time on the melody and accompaniment. Reference numeral 113 denotes a handle allowing the user to place notes for composing a melody. The handle 113 can move up and down along the play bar 111 according to the touch input. The portable device plays the melody by generating tones mapped to the notes indicated by the handle 113 moving along the play bar 111. Reference numeral 115 denotes a trace of the handle 113 with respect to time. As the music progresses, the drawing region 110 scrolls from left to right such that the trace 115 is drawn from right to left continuously.

The accompaniment playback region 120 shows the elapsed time currently being performed in unit play time. The unit play time is indicated by Arabic figures (1, 2, 3, . . . ). In FIG. 1*a*, the unit play times 1 and 2 are displayed in the accompaniment playback region 120. In typical scores, the chord changes per measure. For example, the unit play time can be a measure of the score. Also, the unit play time can be a duration for which the same chord is maintained. The accompaniment can be played according to a specific chord in each unit play time. In FIG. 1*a*, the music is played in the unit play time 2 according to the location of the play bar 111.

As described above, the accompaniment region 120 is scrolled in synchronization with the drawing region 110. Under the assumption that the unit play times 1 and 2 correspond to the first and second measures of the music sheet (score), the unit play times 1 and 2 shows the scrolling of the accompaniment region from right to left in FIG. 1*a*.

The control region 130 is provided with a plurality of menu buttons for storing, playing, and editing the music in response to a touch input of the user. The control region 130 also the menu buttons for activating the arrangement mode, playback mode, ensemble mode, and mixing mode.

In an exemplary embodiment of the present invention, the portable device detects a touch input and plays a melody (tones) from the position at which the touch event is detected. At this time, the portable device retrieves and plays the melody corresponding to the chord of the current accompaniment.

In more detail, if the handle 113 is moved up and down in response to the touch input of the user, a melody (tones) corresponding to the position of the handle 113 is played. For example, the drawing region 110 is vertically mapped to the tones from low to high. Accordingly, the higher the handle 113 moves up along the play bar 111, the higher the tone is. That is, the drawing region is partitioned into sections vertically (not shown) that are mapped to the note scales.

The melody (tones) is played according to the position of the handle in the drawing region 110 and can be changed depending on the accompaniment played along with. As mentioned, the accompaniment is played according to the chord for each unit play time and thus the tones corresponding to the position of the handle 113 and the chord of the accompaniment are played.

In FIG. 1*b*, the drawing region 110 is depicted having the note scale of 1 octave matching the keyboard of a piano as the accompaniment instrument. Although 1 octave note scale is depicted in FIG. 1*b* to illustrate the principles of the invention, multiple octave note scales, preferably a2 octave scale, can be easily implemented without undue experimentation on thus skilled in the art. A number of octaves for the note scale can be changed depending on a user configuration or manufacturer settings.

The notes are changed according to the chord corresponding to the unit play time. The note scale and chord can be displayed, or not, in the drawing region 110 depending on the user configuration.

In FIG. 1*b*, the chords "A" and "Am" are depicted as an example. In the case of the chord "A", the note scale consists of the notes C# D E F G A B C#. In case of the chord "Am", the note scale consists of the notes C D E F G A B C.

Assuming that the chords of the unit play times 1 and 2 are "A" and "Am" respectively, the sound is played when the handle 113 is placed at one of the notes C# D E F G A B C# for the unit play time 1 and when the handle 113 is placed at one of the notes C D E F G A B C for the unit play time 2.

In this manner, if the user moves the handle 113 by touch input, the portable device plays a melody (tones) mapped to the note scale of the corresponding chord. In FIG. 1*b*, the curved line indicates the trace of the handle 113, and the portable device plays the melody consisted of the notes mapped to positions 11, 13, 15, 17, 19, and 21 in the drawing region 110 along with the accompaniment chords.

Figure 2A:
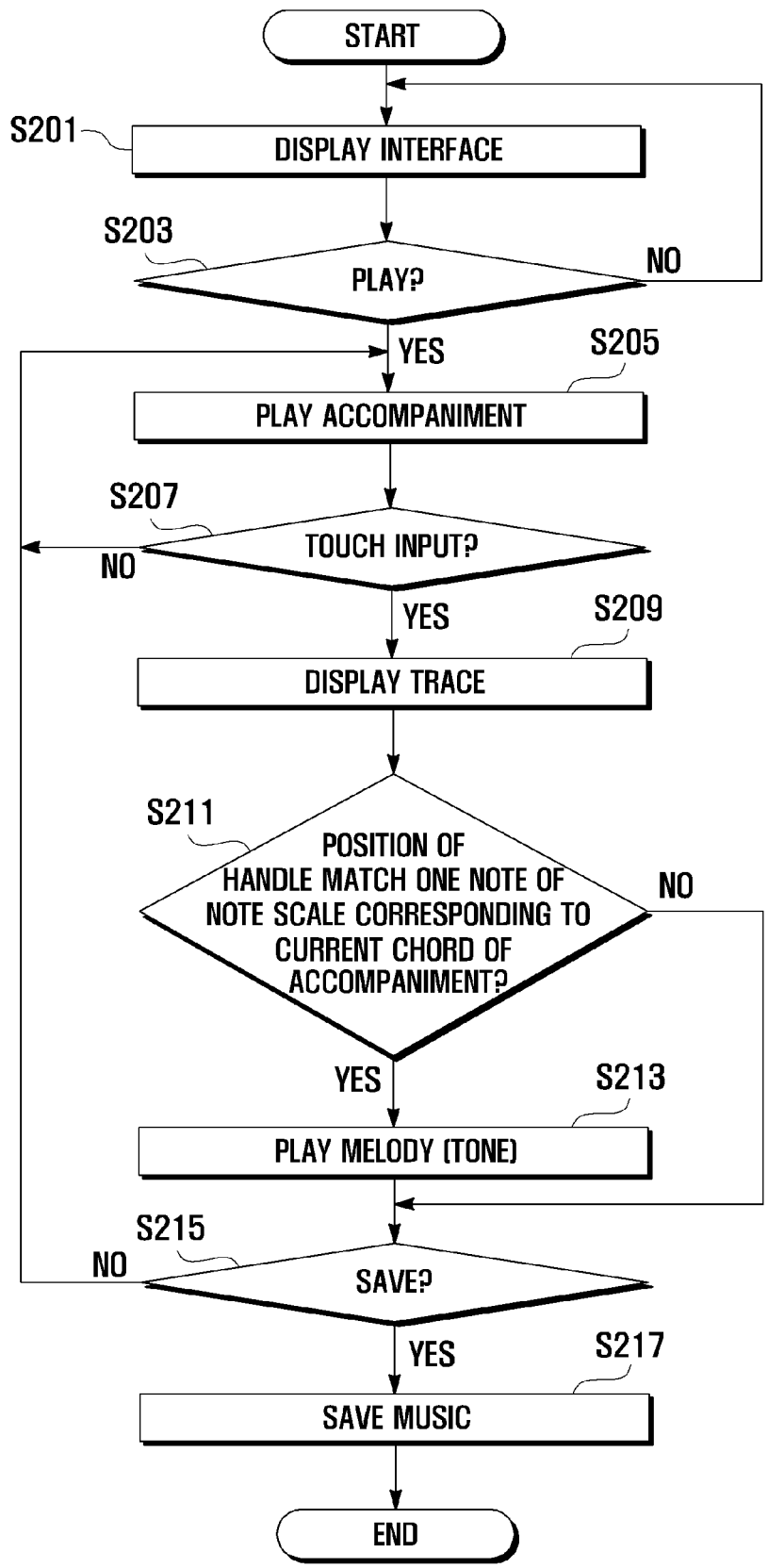
FIG. 2a is a flowchart illustrating a music composition procedure according to an exemplary embodiment of the present invention.
Figure 2B:
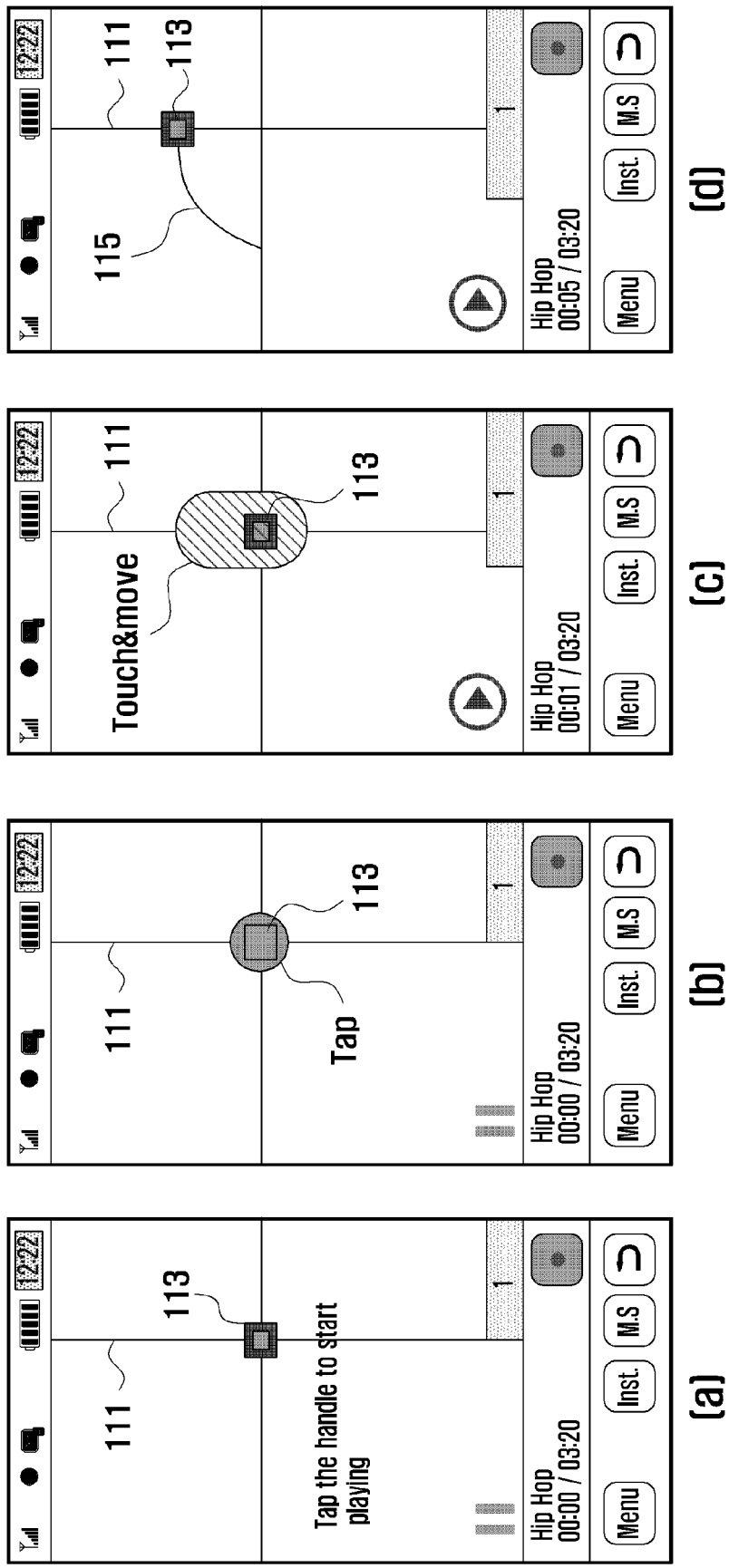

FIG. 2*a* is a flowchart illustrating a music composition procedure according to an exemplary embodiment of the present invention, and FIG. 2*b* is a diagram illustrating operations of a composition mode screen of the portable device is association with the procedure of FIG. 2*a*.

As previously described, the portable device plays a melody (tones) selected by the touch input of the user which is mapped to the note scale varying according to the accompaniment chord. The user can select at least one instrument for the accompaniment using the menu options provided by the portable device (FIG. 1*a*). The user also can select at least one instrument, preferably one instrument, for the melody. How to select the instruments for the melody and accompaniment is described later in detail.

In FIGS. 2*a* and 2*b*, it is assumed that the accompaniment instruments have been selected already for playing specific chords corresponding to the respective unit play times. The selection and configuration of the accompaniment instruments are described later in detail.

If a menu option is selected for activating the composition mode, the portable device activates the composition mode with the presentation of the composition mode screen as shown in image (a) of FIG. 2*b* (S201). The composition mode screen includes the drawing region 110, the accompaniment region 120, the play bar 111, and the handle 113.

The drawing region 110 is mapped to the note scale which varies according to the chord of the unit play time. After the activation of the composition mode, the portable device monitors for a touch input to detect an accompaniment play command for playing a user-selected accompaniment (S203). If the accompaniment play command is detected, the portable device plays the accompaniment (S205). The accompaniment play command can be input by the user tapping the handle 113 on the touchscreen as shown in image (b) of FIG. 2*b*.

As the accompaniment progresses, the portable device displays the corresponding unit play time in the accompaniment region 120. The play time units scroll from right to left in synchronization with the speed of the meter. Since note scale varies according the chord of the unit play time, it changes according to the chord in synchronization with the unit play time as the drawing region 110 and the accompaniment region 120 are scrolling.

While playing the accompaniment, the portable device monitors to detect a touch input. The portable device continues playing the accompaniment until a touch input is detected. This includes when a touch release action.

If a touch input is detected, the portable device displays the trace 115 of the handle 100 (209). The handle 100 can be moved according to the touch input of the user. The image (c) of FIG. 2*b* show the upward movement of the handle 113 according to the user's touch input, i.e. "touch and move" action. As a result of this touch input, the trace 115 of the handle 113 is drawn as shown in image (d) of FIG. 2*b*. In this manner, the portable device displays the movement of the handle 113 as a curved trace in association with the scroll of the drawing region 100.

After drawing the trace of the handle 113, the portable device determines whether the position of the handle matches a note of the note scale corresponding to the current chord of the accompaniment (S211). If the position of the handle matches a note of the note scale, the portable device plays the melody (tone) matched with the note scale (S213). Otherwise, the process goes to step S215.

The above described steps are repeated until the save command is detected at step S215. That is, the portable device repeats steps 205 to 213 for playing the accompaniment, drawing the trace of the handle 113 in response to the user's touch input, and playing the tone mapped to the note of the note scale.

If the position of the handle does not match a note of the note scale at step 211, the portable device determines whether a save command is input (S215).

If the save command is detected, the portable device saves the trace, accompaniment, and melody as a music piece in a combined form (S217).

The stored music piece can be played in response to a playback request of the user. At this time, the melody and accompaniment of the music piece are played simultaneously with the display of the trace. The playback mode is described hereinafter.

Figure 3A:
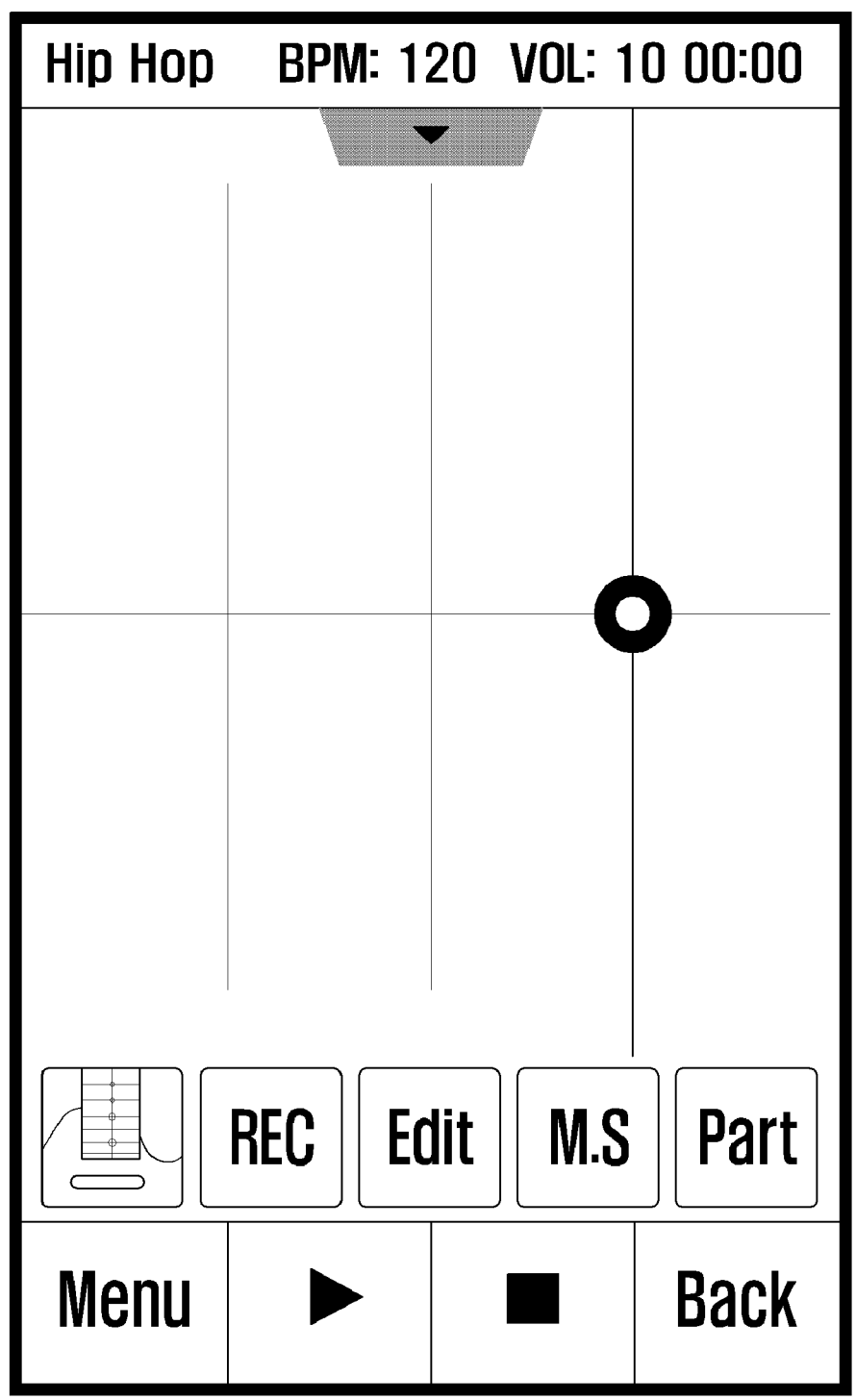
FIG. 3a is a screen image illustrating a playback mode screen when the portable device enters the playback mode according to an exemplary embodiment of the present invention.
Figure 3B:
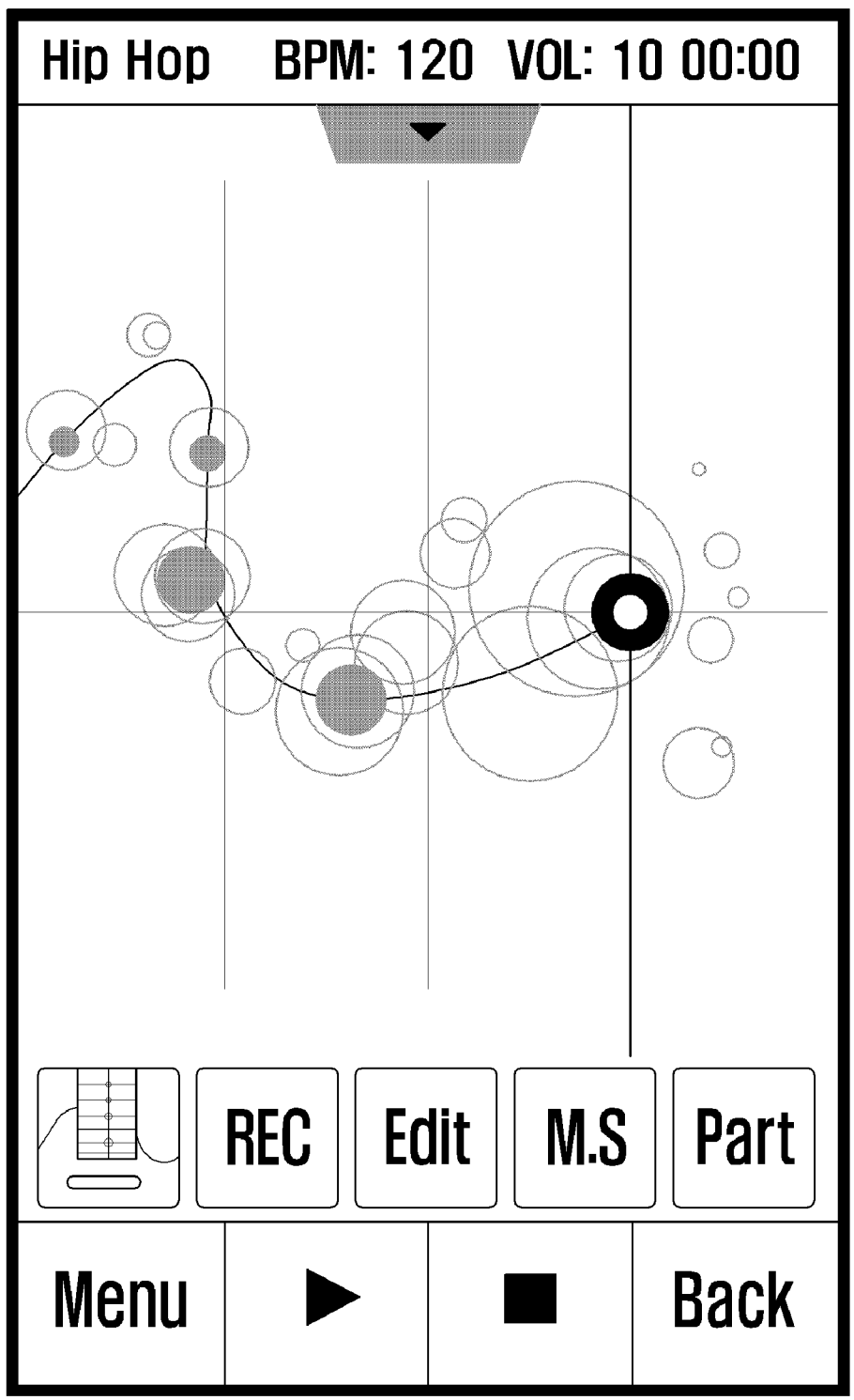
FIG. 3b is a diagram illustrating a screen image of the playback mode screen when the portable device plays a music piece in the playback mode according to an exemplary embodiment of the present invention.

FIG. 3a is a screen image illustrating a playback mode screen when the portable device enters the playback mode according to an exemplary embodiment of the present invention, and FIG. 3b is a diagram illustrating a screen image of the playback mode screen when the portable device plays a music piece in the playback mode according to an exemplary embodiment of the present invention. The music piece can be composed and stored as described above and then played in response to a user request.

The portable device can be configured to provide various sound effects and visual effects.

In the playback mode activated with a sound effect and the playback mode screen as shown in FIG. 3b, a specific sound effect can be added to the melody and accompaniment using the function such as a MIDI filter and wave effect (FX). The midi is an interface for controlling electronic instruments by means of a computer. The MIDI filter is a function that provides variation to the tone signal generated by the MIDI using a specific algorithm. The FX is an audio processing function for giving the sound field effects such as reverb and chorus.

For example, the "delay" MIDI filter can give an echo effect to the sound of a note. The FX can give a distortion effect to a Pulse Code Modulation (PCM) audio sample so as to be heard as the distortion of an electric guitar.

In case that a music piece is played with a basic visual effect, the portable device displays the trace of the handle 113. In an exemplary embodiment of the present, the visual effect can be presented with a graphic image characterized by various shapes, sizes, colors, and transparency depending on the trace. FIG. 3b shows an exemplary graphic image display when the music piece is played.

The graphic image can be composed of circles, squares, and other figures that can be adjusted in size. The exemplary graphic image of FIG. 3b is composed of a plurality of circles. These circles can be arranged along the trace corresponding to the melody (tones) in consideration of the note scale. The currently playing tone is highlighted with relatively large circles and other tones on the trace decorated with relatively small circles. The graphic image can be configured such that the circles can be filled with different colors in different transparency and opacity according to the note. In FIG. 3b, the circles around the current playing tone are opaque, and the circles around played already are drawn in different transparency.

The pitch of a tone can be used to determine the size and transparency of a graphic element such that the tone having a low pitch is represented by a graphic element colored in high transparency and the tone having a high pitch is represented by a graphic element colored in low transparency. The color of the representative graphic element can be changed according to the mood of a tone or the genre of the music. Also, the shape of a graphic element can be changed according to the instrument.

As described above, a music piece can be played with various sound and visual effects in the playback mode.

A description is made of the arrangement mode according to an exemplary embodiment of the present invention hereinafter.

Figure 4A:
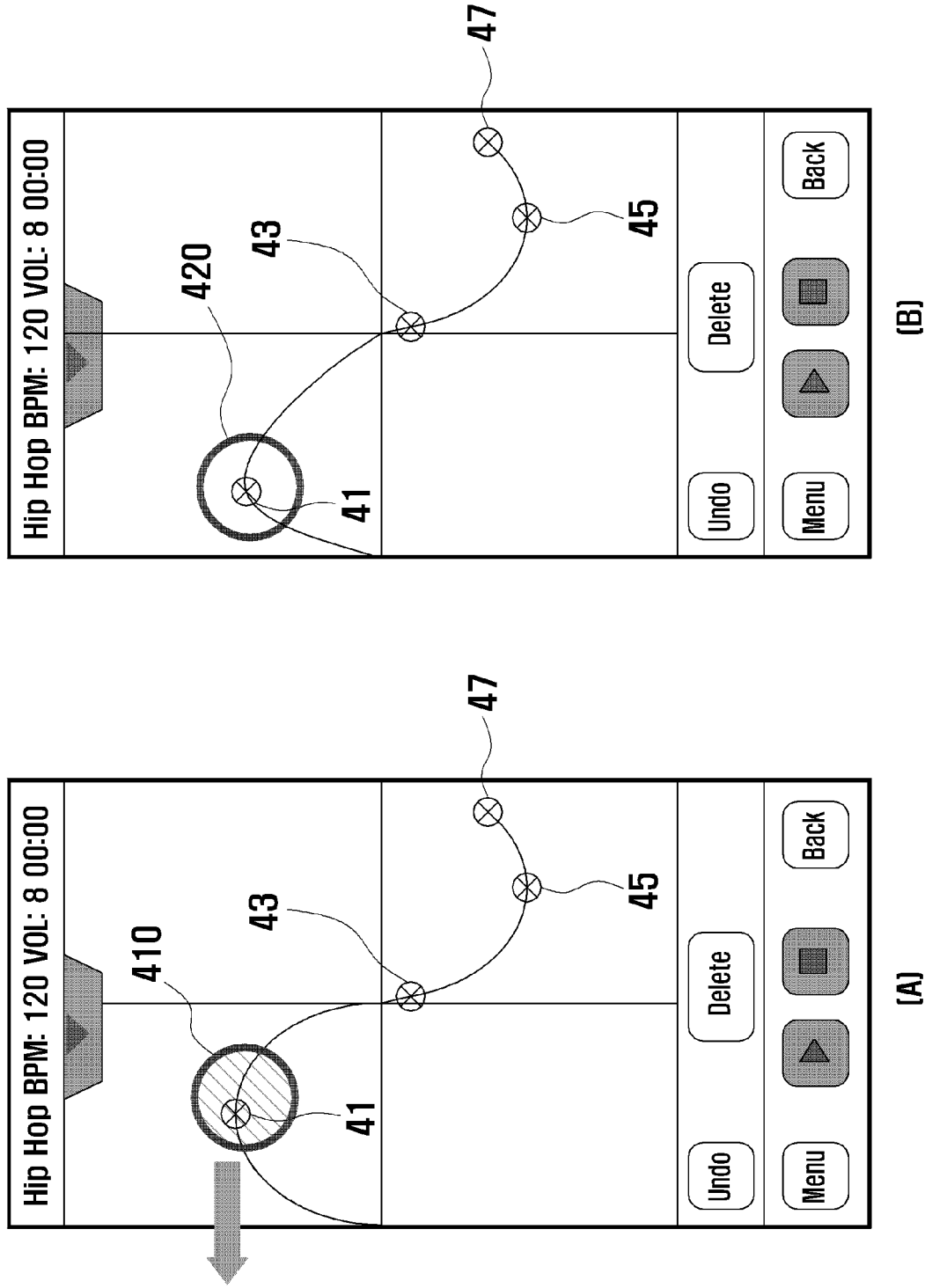
FIG. 4a is a diagram illustrating arrangement mode screens of the portable device according to an exemplary embodiment of the present invention.
Figure 4B:
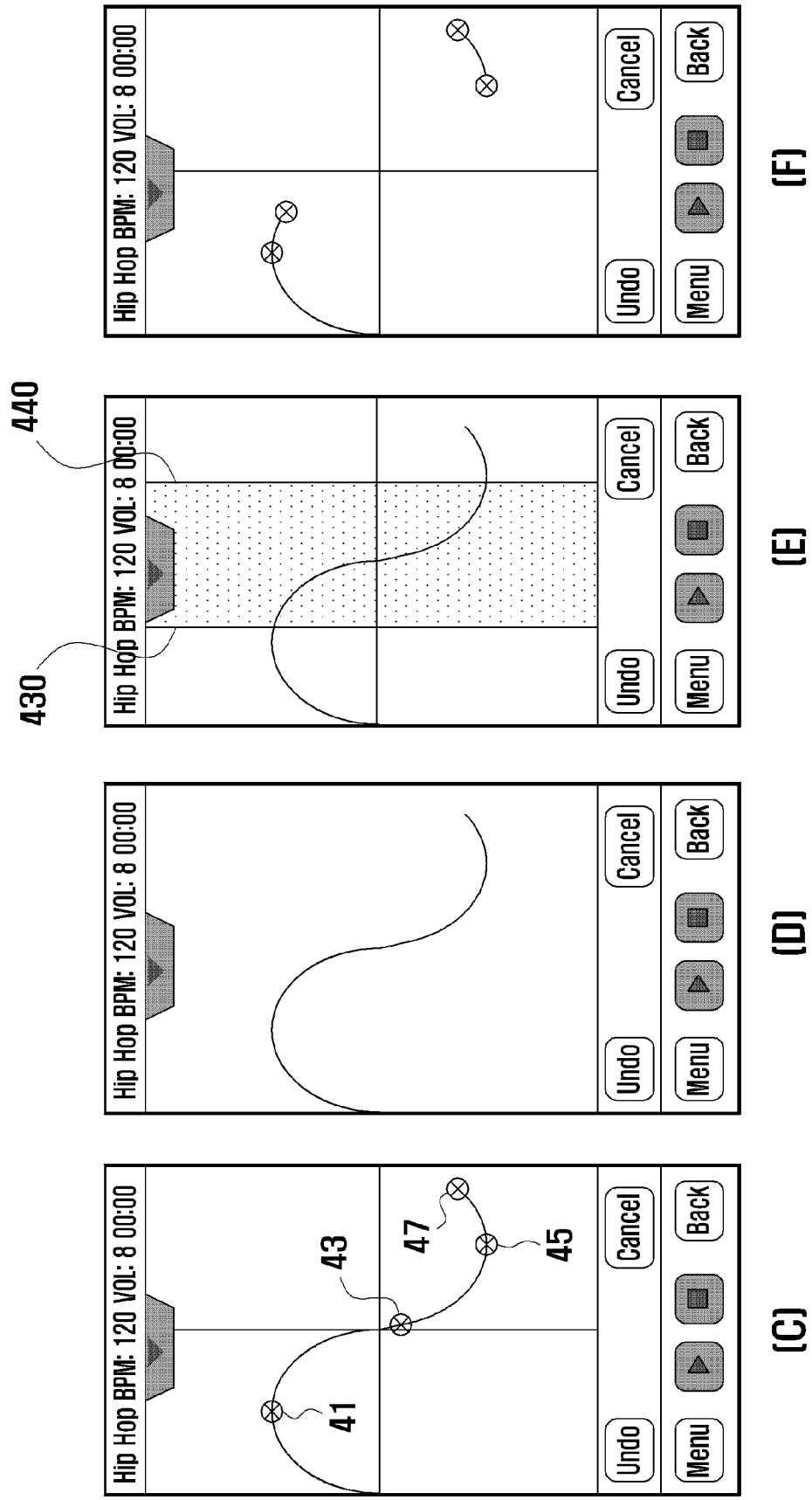
FIG. 4b is a diagram illustrating arrangement mode screens of a portable device according to another exemplary embodiment of the present invention.
Figure 4C:
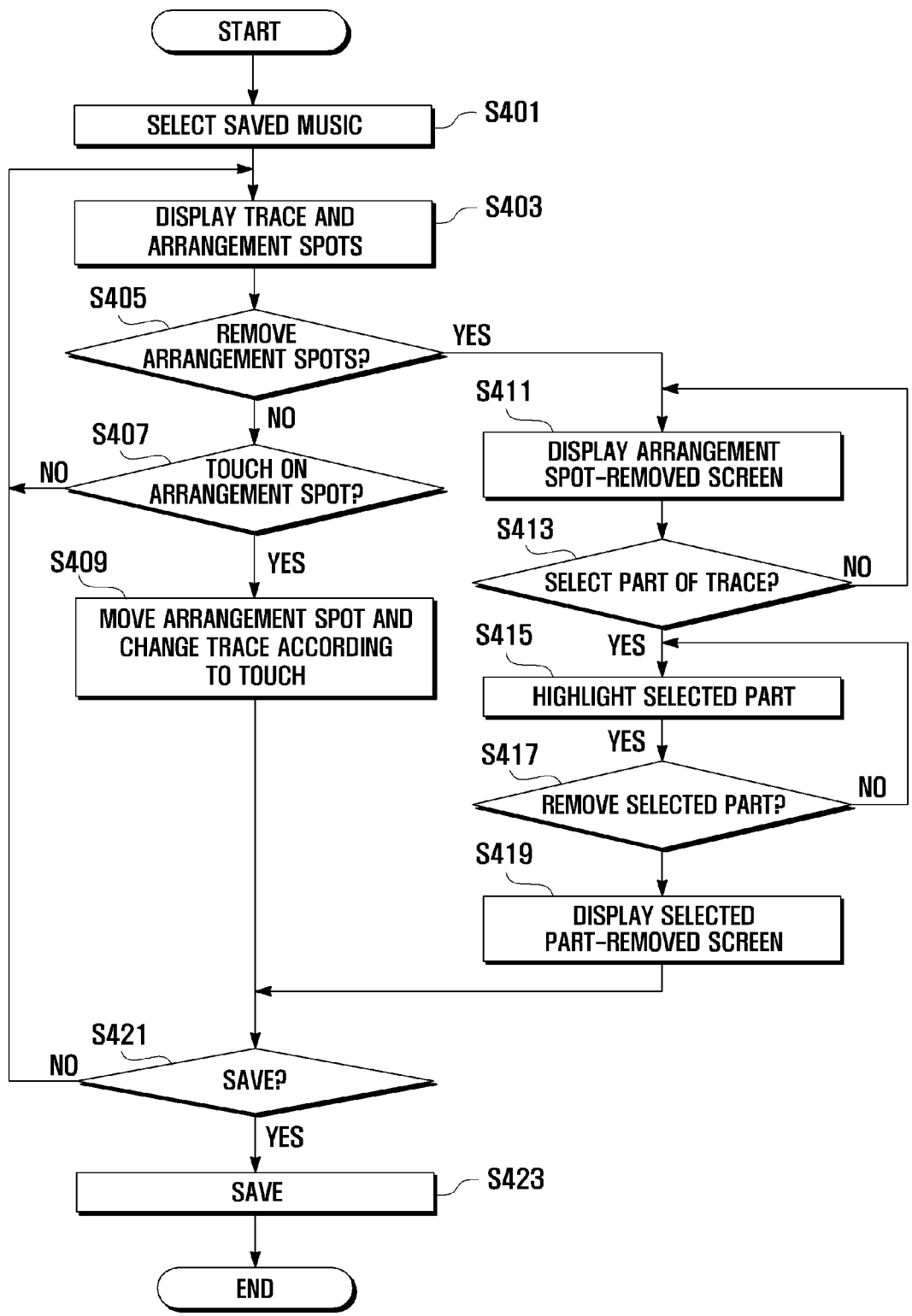
FIG. 4c is a flowchart illustrating an arrangement procedure for in the portable device according to an exemplary embodiment of the present invention.

FIGS. 4a and 4b are diagrams illustrating arrangement mode screens of the portable device according to an exemplary embodiment of the present invention and FIG. 4c is a flowchart illustrating an arrangement procedure for in the portable device according to an exemplary embodiment of the present invention.

Referring to FIG. 4a, the arrangement mode screen includes arrangement spots placed on the trace such that the user can arrange the music piece by manipulating or adjusting the arrangement spots.

The image (A) of FIG. 4a shows the arrangement mode screen displayed when the arrangement mode is activated, and the image (B) of FIG. 4a shows the arrangement mode screen in which an arrangement is done. Once the arrangement mode is activated, the arrangement mode screen having the drawing region 110 in which the trace 115 of the melody of a user-selected music piece is displayed as shown in FIG. 4a. Reference numerals 41, 43, 45, and 47 denote respective arrangement spots. The arrangement spots are places along the trace 115 at a predetermined interval and can be used for arranging the music piece.

The user can move each arrangement spot by means of a touch input operation. If an arrangement spot is moved to another position, the trace of the melody is changed according to the changed position of the arrangement spot. FIG. 4b shows the variation of the trace according to the movement of the spot 41 from the position 410 (see image A of FIG. 4a) to the position 420 (see image B of FIG. 4a).

As shown in images (A) and (B), if the user moves the arrangement spot 41 from the position 410 to another position 420, the trace of melody is changed in accordance with the movement of the arrangement spot. In this manner, the user can arrange the music piece by changing the position of the arrangement points.

FIG. 4b shows another method for arranging the music piece without use of the arrangement spots. Once the arrangement mode is activated, the arrangement mode screen is described as shown (C) of FIG. 4b. The arrangement mode screen of the image (C) is provided with a plurality of arrangement spots placed along the trace of melody of the loaded music piece.

In case that it is required to arrange the music piece without use of the arrangement spots, the arrangement spots can be removed from the arrangement mode screen by user manipulation. The image (D) of FIG. 4b shows the arrangement mode screen from which the management spots have been removed.

The user can appoint a specific section of the drawing region of the arrangement screen in a horizontal direction by a touch input. In the image (E) of FIG. 4b, reference numerals 430 and 440 denote the start and end points of the section appointed by the user.

Once the section is appointed with the start and end points 430 and 440, the user can input a command for deleting the appointed section. If the delete command is input, the trace of a melody in the appointed section disappears as shown in the image (F) of FIG. 4b. In this manner, the music piece loaded in the arrangement mode can be arranged by deleting a specific part of the melody.

The arrangement operation is described in more detail with reference to FIG. 4c. In the arrangement mode, if the user selects a music piece created in the portable device, the portable device loads the selected music piece (S401) and displays the trace of the melody of the selected music piece and the arrangement spots along the trace (S403). The images (A) of FIG. 4a and (C) of FIG. 4b show the exemplary arrangement mode screen on which the trace and arrangement spots are displayed. The trace and the arrangement spots can be created when the corresponding music piece is created in the composition mode.

The user can arrange the loaded music piece with or without use of the arrangement spots. Accordingly, the portable terminal monitors for the input of a user command for removing the arrangement spots (S405). If the arrangement spots removal command is detected, the progress proceeds to step S411.

Otherwise, if the arrangement spots removal command is not detected, the portable device determines whether a touch event is detected on an arrangement spot (S407). If a touch event is detected on an arrangement spot, the portable device moves the arrangement spot according to the detected touch event (S409). At this time, the trace is changed in accordance with the movement of the arrangement spot. The image (B) of FIG. 4a shows an exemplary screen on which movement of the arrangement spot has occurred.

If the arrangement spots removal command is detected at step S405, the portable device removes the arrangement spots from the screen (S411). The image (D) of FIG. 4b shows an exemplary screen on which the removal of the arrangement spots has occurred. Next, the portable device monitors for the input of a user command to select part of a trace (S413). If a section appointment command is detected at step S413, the portable device selects a section according to the section appointment command and highlights the selected section on the screen (S415). The image (E) of FIG. 4b shows an exemplary screen on which a section of the drawing region is selected. While displaying the highlighted section, the portable device monitors the input screen to detect a user command regarding removing a selected part (S417). If an appointed section removal command is detected at step S417, the portable device removes the appointed section and displays the screen from which the appointed section has disappeared (S419). The image (F) of FIG. 4b shows an exemplary screen on which the appointed section has disappeared.

After the change of the trace at step S409 or the removal of the appointed section at step S419, the portable device monitors the touch screen to detect a user command for saving the arrange music piece (S421). If a save command is detected at step 421, the portable device saves the arranged music piece (S423). Otherwise, if no user command is detected at step S421, the process goes to step S403.

Figure 5A:
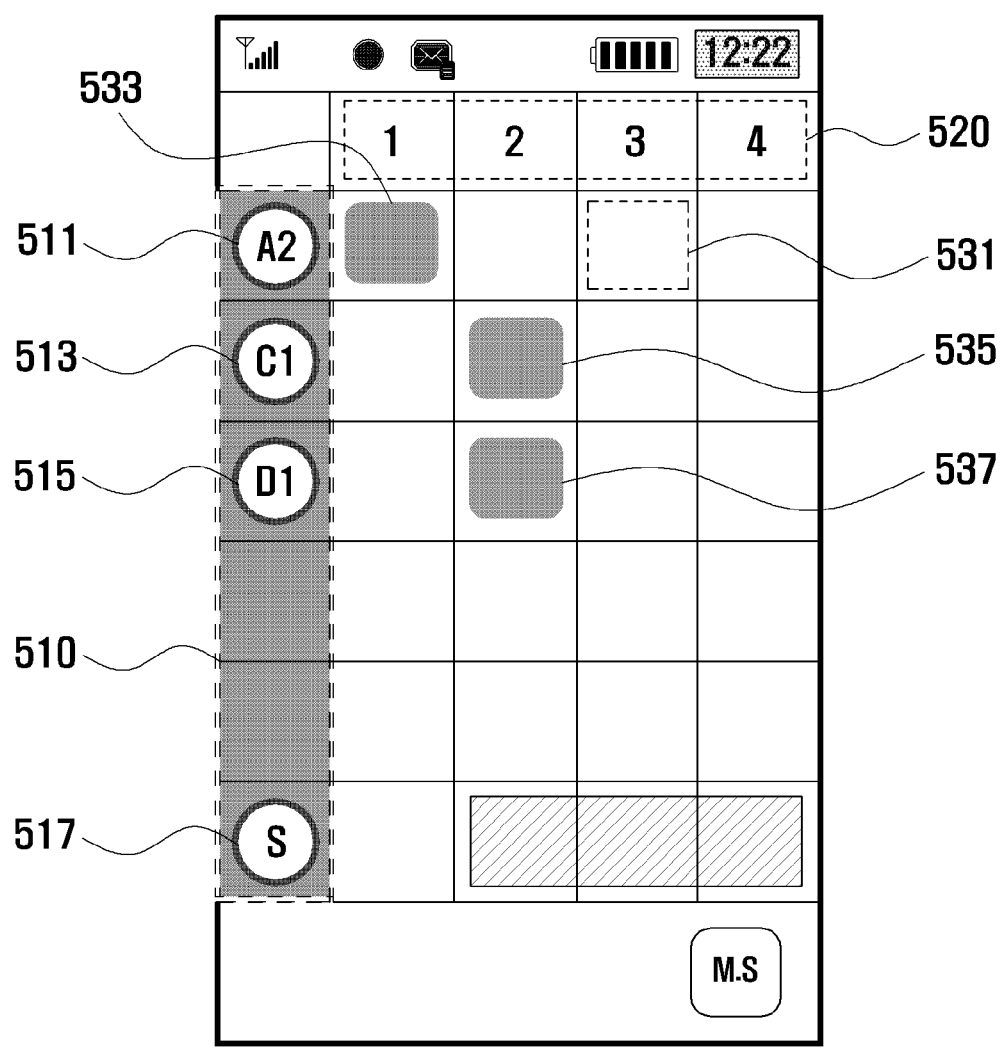
FIG. 5a is a diagram illustrating an ensemble mode screen of the portable device according to an exemplary embodiment of the present invention.
Figure 5B:
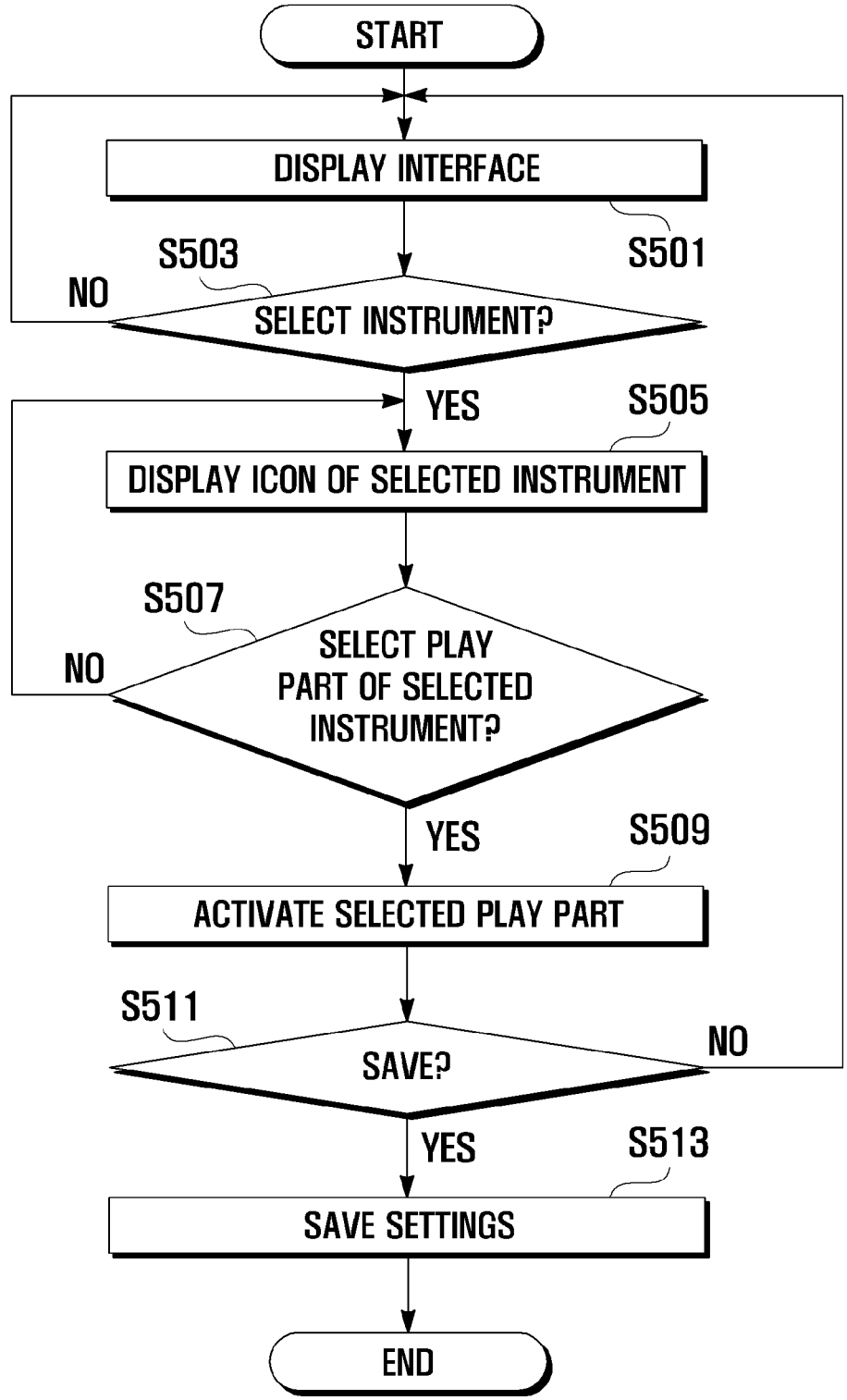
FIG. 5b is a flowchart illustrating an ensemble setting procedure in the portable device according to an exemplary embodiment of the present invention.

A description is made of the ensemble mode according to an exemplary embodiment of the present invention hereinafter. FIG. 5a is a diagram illustrating an ensemble mode screen of the portable device according to an exemplary embodiment of the present invention, and FIG. 5b is a flowchart illustrating an ensemble setting procedure in the portable device according to an exemplary embodiment of the present invention.

As previously described, the portable device can play the melody formed by the touch input of the user and/or accompaniment in the composition mode and the playback mode. The accompaniment can be played by multiple instruments. In the ensemble mode, the user can select at least one instrument and at least one accompaniment played by the at least one instrument.

FIG. 5a shows the ensemble mode screen image. Reference numeral 510 denotes an instrument column in which icons representing the instruments that can be selected by the user, and reference numeral 520 denotes a unit play time row in which the continuous unit play times are aligned.

The user can select the instruments for playing the melody and/or accompaniment by touching the instrument icons 511, 513, and 515 displayed in the instrument column 510. The instrument column also displays a music icon 517 representing the music piece selected by the user selection.

The icons 511, 513, 315, and 517 can be the images representing the instrument families. For example, an icon can represent a piano family including acoustic piano, electric piano, chorus piano, and the like. In this case, the portable terminal stores the sound sources of all the instruments that belong to the same instrument family. The user can select at least one instrument from the same instrument family.

The unit play times are assigned Arabic numbers (1, 2, 3, . . . ). A unit play time can be a measure for playing the accompaniment of a chord.

Reference numeral 531 denotes a part represented by a grid defined by an instrument row and a unit play time column. Each part can be activated or deactivated by a user's manipulation.

If a part is empty as denoted by reference numeral 531, this means that the part is deactivated. If an instrument is selected at a specific unit play time by the user, the corresponding part is shaded to indicate the activation of the instrument at the unit play time. The parts denoted by reference numbers 533, 535, and 537 are shaded in gray and this means that the instruments on the corresponding rows are played at their corresponding unit play times.

For example, assuming that the user selects the icons 511, 513, and 515 for the respective instruments of a bass, a guitar, and a piano, the part 533 is set for playing the bass at the unit play time 1, the part 535 for playing the guitar at the unit play time 2, and the part 537 for playing the piano at the unit play time 2.

In case that a part is activated, the instrument on the row of the part plays the accompaniment according to the chord designated for the unit play time on the column of the part. The portable device can store a plurality of accompaniments for the corresponding instruments, and the user can activate each part for the accompaniment of the corresponding instrument.

For example, assuming that the chord "A" is designated for the unit play time 2, the notes A C# E can be played on a guitar in various style. The guitar can be played in a stroke type or an arpeggio style. In an exemplary embodiment of the present invention, the ensemble mode can be configured such that the instruments play the accompaniment of the same chord in different styles.

The ensemble mode is described in more detail with reference to FIG. 5b. In the ensemble mode, the portable device displays an ensemble mode screen (S501). While displaying the ensemble mode screen, the portable device monitors the input device in order to detect a command input by the user (S503). If an instrument selection command is detected at step 503, the portable device displays the icon representing the selected instrument (S505).

Also, the user can select a unit play time for the selected instrument to play the accompaniment. After displaying the instrument icon at step S505, the portable device monitors the input device in order to detect a user command for selecting a unit play time (S507). If a unit play time selection command is detected at step S507, the portable device activates the part defined by the selected instrument row and the selected unit play time column (S509). If the part is activated, the instrument plays the accompaniment according to the chord mapped to the unit play time.

The user can select at least one instrument in the above described manner. Accordingly, steps S501 to S509 are repeated for selecting other instruments and unit play times for the selected instruments until a save command is input by the user. The portable device monitors the input device in order to detect a user save command (S511). If a save command is detected at step S511, the portable device saves the settings (S513) and then terminates the ensemble mode procedure.

As described above, the user can select the instruments to play the accompaniment and playback positions and times of the selected instruments in the ensemble mode. Particularly when selecting multiple instruments, it is possible to configure the multiple instruments playing the accompaniment as an ensemble.

Figure 6B:
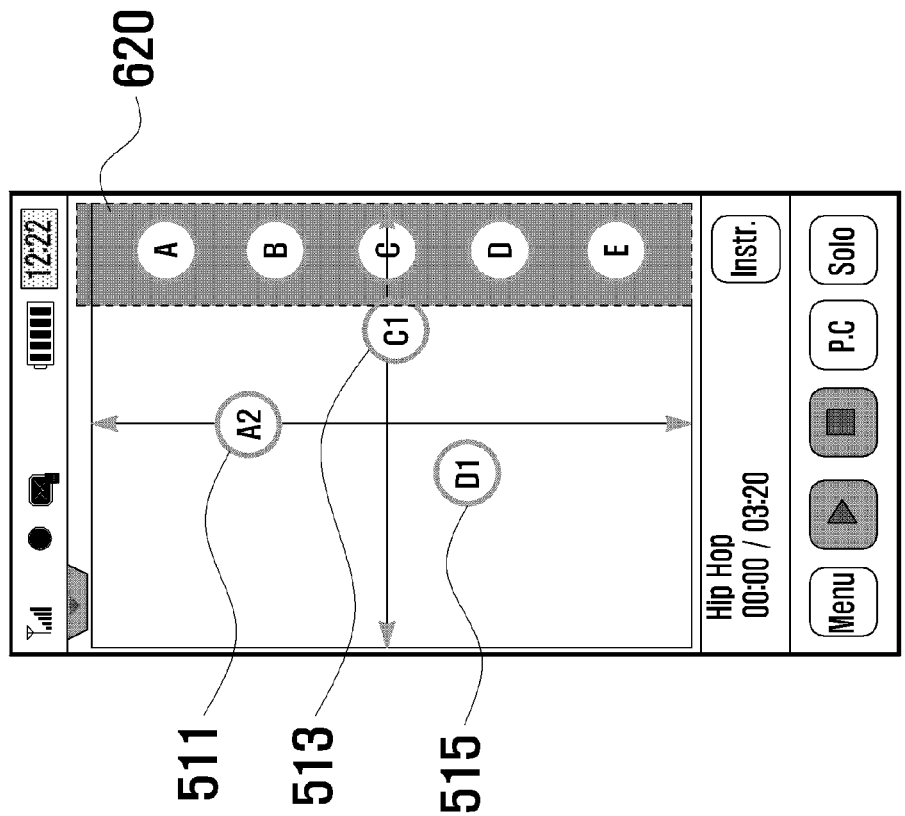
FIGS. 6a to 6c are diagrams illustrating mixing mode screens of the portable device according to an exemplary embodiment of the present invention.
Figure 6A:
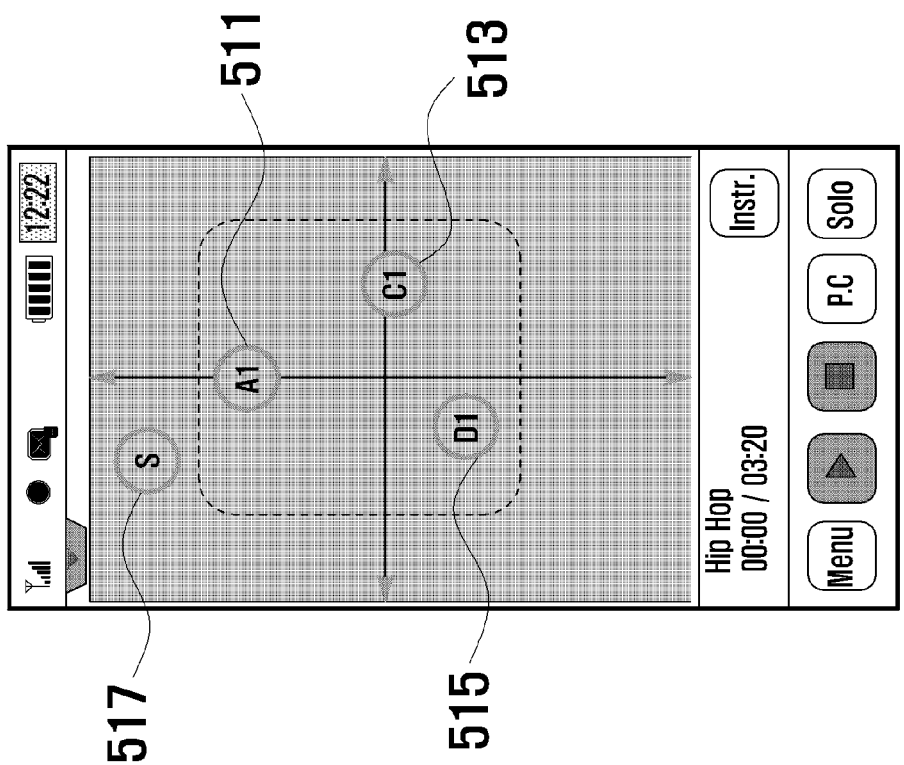
Figure 6C:
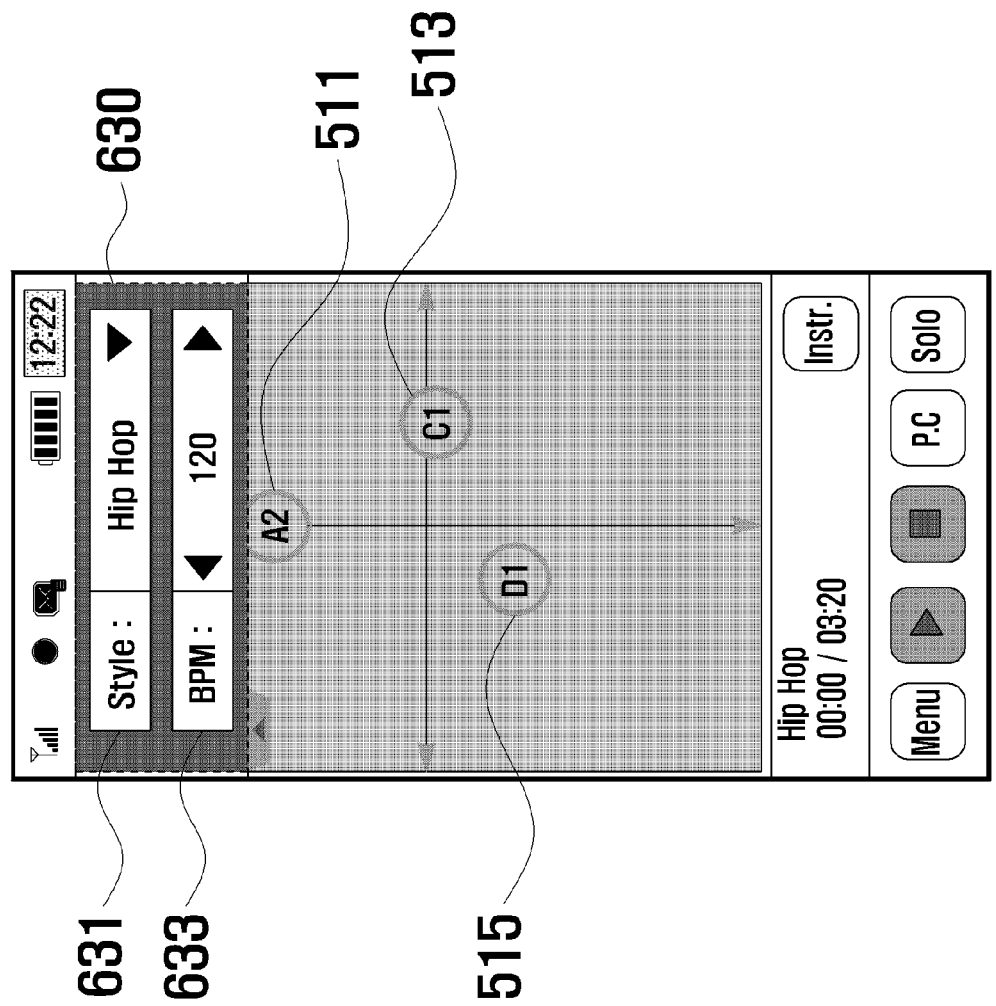

A description is made of the mixing mode according to an exemplary embodiment of the present invention. FIGS. 6a to 6c are diagrams illustrating mixing mode screens of the portable device according to an exemplary embodiment of the present invention.

As described with reference to FIGS. 5a and 5b, various instruments can be selected for playing the accompaniment in an ensemble. In an exemplary embodiment of the present invention, when multiple instruments are selected to play the accompaniment, the instruments can be adjusted in volume and pan (i.e., panoramic potentiometer to control left and right axis) individually.

Referring to FIG. 6a, the mixing mode screen includes instrument icons. On the mixing mode screen, the user can rearrange the icons 511, 513, 515, and 517 by means of a touch input. Each icon is adjusted in volume and pan according to its arranged position. The icons A2 (511), C1 (513), and D1 (515) represent the respective accompaniment instruments, and the icon S (517) represents the melody instrument.

The vertical axis is mapped to volume levels increasing from bottom to top, and the horizontal axis is mapped to pan increasing from left to right. The lower the icon moves to, the lower the volume of the instrument is. The more right the icon moves to, the louder the sound of the right speaker (earphone) becomes and the weaker the sound of the left speaker (earphone) becomes. In the same manner, the more left the icon moves, the louder the sound of the left speaker (earphone) becomes and the weaker the sound of the right speaker (earphone) becomes.

In FIG. 6a, the instrument sound represented by the icon A2 (511) is output at the highest volume and the instrument sound represented by the icon D1 (515) at the lowest volume level among the three accompaniment instruments 511, 513, and 515. The icon C1 (513) indicates that the right channel output of the corresponding instrument sound is louder than the left channel output, the icon D1 (515) indicates that the left channel output of the corresponding instrument sound is louder than the right channel output, and the icon A2 (511) indicates that the left and right channel outputs of the corresponding instrument sound are identical with each other. The icon S (517) represents the melody created by the user. Also, the melody can be adjusted in volume and pan and set in the same manner as the accompaniment instrument sounds.

As previously described, the accompaniment instruments can be added or removed according to the user's intention. The addition and removal of the accompaniment instruments can be done with the corresponding instrument icons. FIG. 6b is an exemplary screen image to show how to add and remove the instrument icons.

If a touch event is detected on the mixing mode screen, the portable device displays an instrument group tray 620. The instrument group tray 620 includes instrument icons representing various musical instruments. In order to simplify the explanation, the drawing region exclusive the instrument group tray 620 is called a "mixing region" in FIG. 6b. The user can move an instrument from the instrument group tray 620 to the mixing region or from the mixing region to the instrument group tray 620 by means of a touch event, e.g. drag and drop touch event.

In an exemplary embodiment of the present invention, the accompaniment instruments can be selected by the genre of the music according to the preset configuration. FIG. 6c shows an exemplary mixing mode screen for setting the instruments according to the genre of the music.

If a touch event is detected on the mixing mode screen of FIG. 6a, the portable device displays a setting panel 630 on top of the mixing mode screen as shown in FIG. 6c.

The setting panel 630 includes a style interface 631 for selecting a genre and a BPM interface 633 for selecting a play speed.

The user can select a music genre in the style interface 631. If a music genre is selected in the style interface 631, the instruments (icons) preset for the selected genre are arranged in the mixing region in consideration of the preset volumes and pans. In FIG. 6c, "Hip Hop" is selected as the music genre and thus the instruments (icons) preset for the "Hip Hop" genre are arranged in the mixing region with their preset volumes and pans.

The user can select the play speed of the music using the BPM interface 633, and the instruments play the accompaniment at the speed selected by the user.

As described above, the music composition method and system for a touchscreen-enabled portable device provides the user with a composition interface having a note scale like a music sheet such that the user can composes a music piece intuitively. Also, the music composition method and system changes the note scale according to the variation of the accompaniment, whereby even the begging user can create a music piece in ensemble with the chords.

The above-described methods, which are operable in the portable terminal, according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the computer, processor or dedicated hardware may be composed of at least one of a single processor, a multi-processor, and a multi-core processor.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A music composition method operable in a portable device having a touchscreen, the method comprising:
    setting an accompaniment with chords varying according to the progress of a unit play time;
    playing the accompaniment;
    displaying a trace of a touch input when a user inputs the touch while the accompaniment, performing chords pre-set per a unit playback time displayed in the touchscreen, is played;
    playing a melody having notes matched to pitches corresponding to a position of the touch input to the touchscreen, the melody corresponding to the chords of the accompaniment when the touch is input; and
    saving the trace of the touch, the corresponding accompaniment, and the corresponding melody as a music piece in a combined form.

2. The music composition method of claim 1, wherein the trace is displayed in a drawing region scrolling in accordance with a meter speed of the accompaniment when the touch is detected.

3. The music composition method of claim 1, further comprising:
    displaying the trace as arrangement spots, corresponding to the series of touches, when the saved music piece is requested; and
    changing the trace in accordance with the movement of the arrangement spots, when one of the arrangement spots moves in response to a touch event.

4. The music composition method of claim 1, wherein displaying a trace of the touches comprises:
    removing a selected part of the trace and corresponding parts of the melody and accompaniment when a command for selecting and removing the part of the trace is received.

5. The music composition method of claim 1, further comprising:
    playing, when a play command is input, the melody and accompaniment; and
    displaying the trace in the form of a graphic, the graphic comprising a plurality of geometric figures having distinct shapes, colors, and transparency.

6. The music composition method of claim 1, wherein setting an accompaniment comprises:
    selecting at least one instrument for the accompaniment; and
    selecting at least one unit play time for the selected instrument to play.

7. The music composition method of claim 6, wherein the at least one instrument is represented by a corresponding icon arranged along a vertical axis of the touchscreen, and the at least one unit play time is represented by bars arranged successively along a horizontal axis of the touchscreen.

8. The music composition method of claim 1, wherein setting an accompaniment comprises:
    selecting at least one instrument for the accompaniment; and setting a volume and a pan of the selected instrument.

9. The music composition method of claim 8, wherein the volume is set to increase along a vertical axis of the touchscreen from bottom to top, and the pan is set along a horizontal axis of the touchscreen, the volume and pan of the selected instrument being determined by a position of an icon representing the instrument on the touchscreen.

10. The music composition method of claim 8, wherein the at least one instrument and the volume and the pan of the selected instrument are selected automatically according to a genre of the music piece.

11. A music composition method for a portable device having a touchscreen, the method comprising:
    displaying a handle moving along a vertical axis on the touchscreen in response to a input on the touchscreen;
    selecting an accompaniment having chords pre-set per a unit playback time;
    displaying a trace of a touch input when a user inputs the touch while the accompaniment, performing the chords pre-set per the unit playback time displayed in the touchscreen, is played;
    playing a melody having notes matched to pitches corresponding to a position of the touch input to the touchscreen, the melody corresponding to the chords of the accompaniment when the touch is input; and
    saving the trace of the touch, the corresponding accompaniment, and the corresponding melody as a music piece in a combined form.

12. A music composition system for a portable device having a touch screen, comprising:
    a drawing region having a play bar which indicates a current tone of a melody and a current play time of an accompaniment on the touch screen;
    an accompaniment region which displays unit play times matching the accompaniment; and
    a control region which provides menu options for controlling the melody;
    wherein the drawing region displays a trace of a touch input when a user inputs the touch while the accompaniment, performing chords pre-set per a unit playback time displayed in the touch screen, is played;
    wherein the portable device plays the melody having notes matched to pitches corresponding to a position of the touch input to the touchscreen, the melody corresponding to the chords of the accompaniment when the touch is input; and
    wherein the portable device saves the trace of the touch, the corresponding accompaniment, and the corresponding melody as a music piece in a combined form.

13. The music composition system of claim 12, wherein the drawing region displays a trace of a handle in response to touch inputs, the trace being defined by a line drawn by the movement of the handle.

14. The music composition system of claim 13, wherein the handle moves up and down along the play bar and tones mapped to positions of the handle are played as a melody.

15. The music composition system of claim 12, wherein the control region comprises a save button, a play button, an edit button, an arrangement mode button, a play mode button, an ensemble mode button, and a mixing mode button.

16. A portable terminal for composing a musical composition comprising:
    a touchscreen;
    a display unit; and
    a processor in communication with a memory, the memory including code, which when accessed by the processor causes the processor to:
    receive an input from the touchscreen;
    set an accompaniment with chords varying according to progress of a unit play time in response to the input;
    play the accompaniment;

display a trace of a touch input when a user inputs the touch while the accompaniment, performing the chords pre-set per a unit playback time displayed in the touchscreen, is played;
play a melody having notes matched to pitches corresponding to a position of the touch input to the touchscreen, the melody corresponding to the chords of the accompaniment when the touch is input; and
save the trace of the touch, the corresponding accompaniment, and the corresponding melody as a music piece in a combined form.

17. The terminal of claim 16, the processor further:
display the trace with arrangement spots when the saved music piece is requested, the arrangement spots corresponding to the position of the touches; and
change the trace in accordance with the movement of the arrangement spot, when one of the arrangement spots moves in response to a touch event.

18. The terminal of claim 17, the processor further
display the trace in a drawing region of the display unit; and
scroll the trace in accordance with a meter speed of the accompaniment when a touch is detected.

19. The terminal of claim 16, wherein the processor further:
play, when a play command is input, a melody and an accompaniment; and
display the trace in the form of a graphic, the graphic comprising a plurality of geometric figures having distinct shapes, colors, and transparency.

* * * * *